United States Patent
Saha et al.

(10) Patent No.: US 10,003,295 B2
(45) Date of Patent: Jun. 19, 2018

(54) INVERTER CONTROL DEVICE

(71) Applicant: AISIN AW CO., LTD., Anjo-shi, Aichi-ken (JP)

(72) Inventors: Subrata Saha, Anjo (JP); Arinori Shimada, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days. days.

(21) Appl. No.: 15/126,108

(22) PCT Filed: Mar. 18, 2015

(86) PCT No.: PCT/JP2015/058001
§ 371 (c)(1),
(2) Date: Sep. 14, 2016

(87) PCT Pub. No.: WO2015/151811
PCT Pub. Date: Oct. 8, 2015

(65) Prior Publication Data
US 2017/0093324 A1   Mar. 30, 2017

(30) Foreign Application Priority Data
Mar. 31, 2014   (JP) ................. 2014-073590

(51) Int. Cl.
| H02P 3/22 | (2006.01) |
| H02P 29/024 | (2016.01) |
| H02P 27/08 | (2006.01) |
| H02P 6/14 | (2016.01) |
| B60L 11/18 | (2006.01) |
| H02M 1/36 | (2007.01) |

(52) U.S. Cl.
CPC ........ *H02P 29/024* (2013.01); *B60L 11/1803* (2013.01); *H02M 1/36* (2013.01); *H02P 6/14* (2013.01); *H02P 27/08* (2013.01)

(58) Field of Classification Search
USPC .................................. 318/375–381
See application file for complete search history.

(56) References Cited

U.S. PATENT DOCUMENTS

| 4,904,918 A | * | 2/1990 | Bailey | ........... H02P 3/18 318/759 |
| 8,424,347 B2 | * | 4/2013 | Maekawa | ........... D06F 25/00 68/12.16 |
| 8,441,224 B2 | | 5/2013 | Sumi et al. | |

FOREIGN PATENT DOCUMENTS

| JP | 2011-055582 A | 3/2011 |
| JP | 2011-109797 A | 6/2011 |

* cited by examiner

Primary Examiner — Bentsu Ro
(74) Attorney, Agent, or Firm — Oliff PLC

(57) ABSTRACT

An inverter control device for controlling a rotating electric machine drive device that drives an alternating current rotating electric machine and includes an inverter and a DC link capacitor, the inverter being connected to a DC power supply via a contactor, being connected to the rotating electric machine, and performing power conversion between direct current and three-phase alternating current, the DC link capacitor smoothing a DC link voltage, which is a DC-side voltage of the inverter, and the inverter control device performing switching control on switching elements that form the inverter.

13 Claims, 9 Drawing Sheets

INVERTER CONTROL DEVICE

BACKGROUND

The present disclosure relates to technology for controlling driving of an alternating current rotating electric machine.

A high-output alternating current (AC) rotating electric machine used to power an electric automobile, a hybrid automobile, or the like is driven with a high voltage. Since the high-voltage power supply installed in such an automobile is a DC battery, DC power is converted into three-phase alternating current, for example, by an inverter circuit that uses switching elements. The rotating electric machine not only functions as a motor that outputs power for driving the vehicle using electrical energy, but also functions as a generator that generates electricity using kinetic energy from the vehicle, an internal combustion engine, or the like. Electrical power generated by the rotating electric machine is regenerated and stored in a battery.

Incidentally, there are cases where a switchgear (contactor) is provided between the battery and the rotating electric machine, or more specifically between the battery and the inverter. This contactor is a system main relay (SMR) that is constructed using relays, for example, and the contactor enters a conductive state with closed contact points if the vehicle ignition key (IG key) is in the on state (enabled state), and enters a non-conductive state with open contact points if the IG key is in the off state (non-enabled state). In other words, the battery and the inverter (and the rotating electric machine) are electrically connected when the SMR is in the closed state, and the electrical connection between the battery and the inverter (and the rotating electric machine) is cut off when the SMR is in the open state. During normal operation, the open/closed state of the SMR is also controlled according to the state of the IG key. However, even if the IG key is in the on state, there are cases where the SMR is opened due to a vehicle malfunction, collision, or the like. For example, if the supply of power to the SMR is cut off, if an abnormality occurs in the SMR drive circuit, if the SMR has a mechanical malfunction due to vibration, shock, noise, or the like, or if a disconnection occurs in an SMR peripheral circuit, it is possible for the contact points of the SMR to enter the open state, and for the contactor to enter the open state.

For this reason, if the contactor has entered the open state, there are cases where shutdown control (SD control) is implemented to switch all of the switching elements constituting the inverter to the off state. A smoothing capacitor (DC link capacitor) for smoothing DC voltage (DC link voltage) is often provided on the DC side (in the DC link portion) of the inverter, and if SD control is implemented, the electrical power stored in the stator coil charges the smoothing capacitor via free wheel diodes (FWDs) that are connected in reverse-parallel to the switching elements. For this reason, it is possible for the voltage across the terminals of the smoothing capacitor (DC link voltage) to rise in a short period of time. Giving the smoothing capacitor a higher capacitance and higher withstand voltage to handle this rise in the DC link voltage leads to an increase in the physical size of the smoothing capacitor. This also requires the inverter to have a higher withstand voltage. This consequently hinders reduction of the size of the rotating electric machine drive device, and also influences parts cost, manufacturing cost, and product cost.

Also, when the contactor has entered the open state, there are cases where active short control (active short circuit control (ASC control)) for switching some of the switching elements to the on state to allow current reflux, such as zero vector sequence control (ZVS control), is executed. For example, JP 2011.55582A discloses a control method in which all of the switching elements on the upper side in the inverter are switched to the off state, and any one or more switching elements on the lower side are switched to the on state (JP 2011-55582A: FIG. 2; paragraphs 158, 159, 165, etc.). Although a rise in the DC link voltage can be suppressed with ASC control, a large current (reflux current) flows through the switching elements and the stator coil. Also, the large current continues to flow until the electrical power stored in the stator coil is consumed through heat or the like. For this reason, there is a possibility of wearing down the switching elements and the stator coil, and reducing their lifetime. Also, switching elements and the like that can handle a large current become necessary, and there is a possibility of also influencing parts cost, manufacturing cost, and product cost.

SUMMARY

In light of the aforementioned circumstances, there is desire for technology for, in the case where a contactor that connects an inverter and a DC power supply has entered the open state, suppressing a rise in the DC link voltage of the inverter and suppressing the total amount of reflux current, while also setting the amount of current flowing in the rotating electric machine to zero.

In view of the above, an inverter control device according to an exemplary aspect of the disclosure includes an inverter control device for controlling a rotating electric machine drive device that drives an alternating current rotating electric machine and includes an inverter and a DC link capacitor, the inverter being connected to a DC power supply via a contactor, being connected to the rotating electric machine, and performing power conversion between direct current and three-phase alternating current, and the DC link capacitor smoothing a DC link voltage, which is a DC-side voltage of the inverter, and the inverter control device performing switching control on switching elements that form the inverter, the inverter control device including an electronic control unit with control logic, which when executed, executes when the contactor has entered an open state during rotation of the rotating electric machine, mixed loop control for switching one or two target switching elements out of the switching elements that form the inverter to an on state so as to form one capacitor charging loop for charging the DC link capacitor with electrical power generated by the rotating electric machine and form one reflux loop for causing the generated electrical power to circulate between the inverter and the rotating electric machine.

According to this configuration, after the contactor has entered the open state, mixed loop control is executed so as to form one capacitor charging loop and one reflux loop. In other words, mixed loop control is executed such that shutdown control for forming a capacitor charging loop and active short control for forming a reflux loop are performed at the same time. There is an issue in that although reflux current can be suppressed in shutdown control, the voltage across the terminals of the DC link capacitor (DC link voltage) rises significantly, and although a rise in the DC link voltage can be suppressed in active short control, large current reflux continues to occur. However, if shutdown control and active short control are executed concurrently as in this configuration, it is possible to suppress a rise in voltage caused by shutdown control and suppress a large current generated by active short control. In this way, according to this configuration, in the case where the contactor that connects the inverter and the DC power supply has entered the open state, it is possible to suppress a rise in the DC link voltage of the inverter and suppress the total amount of reflux current, while also setting the current flowing in the rotating electric machine to zero even in the state where the rotational speed of the rotating electric machine is not zero.

Further features and advantages of the present disclosure will become apparent from the following description of embodiments described with reference to the drawings.

DETAILED DESCRIPTION OF EMBODIMENTS

Figure 1:
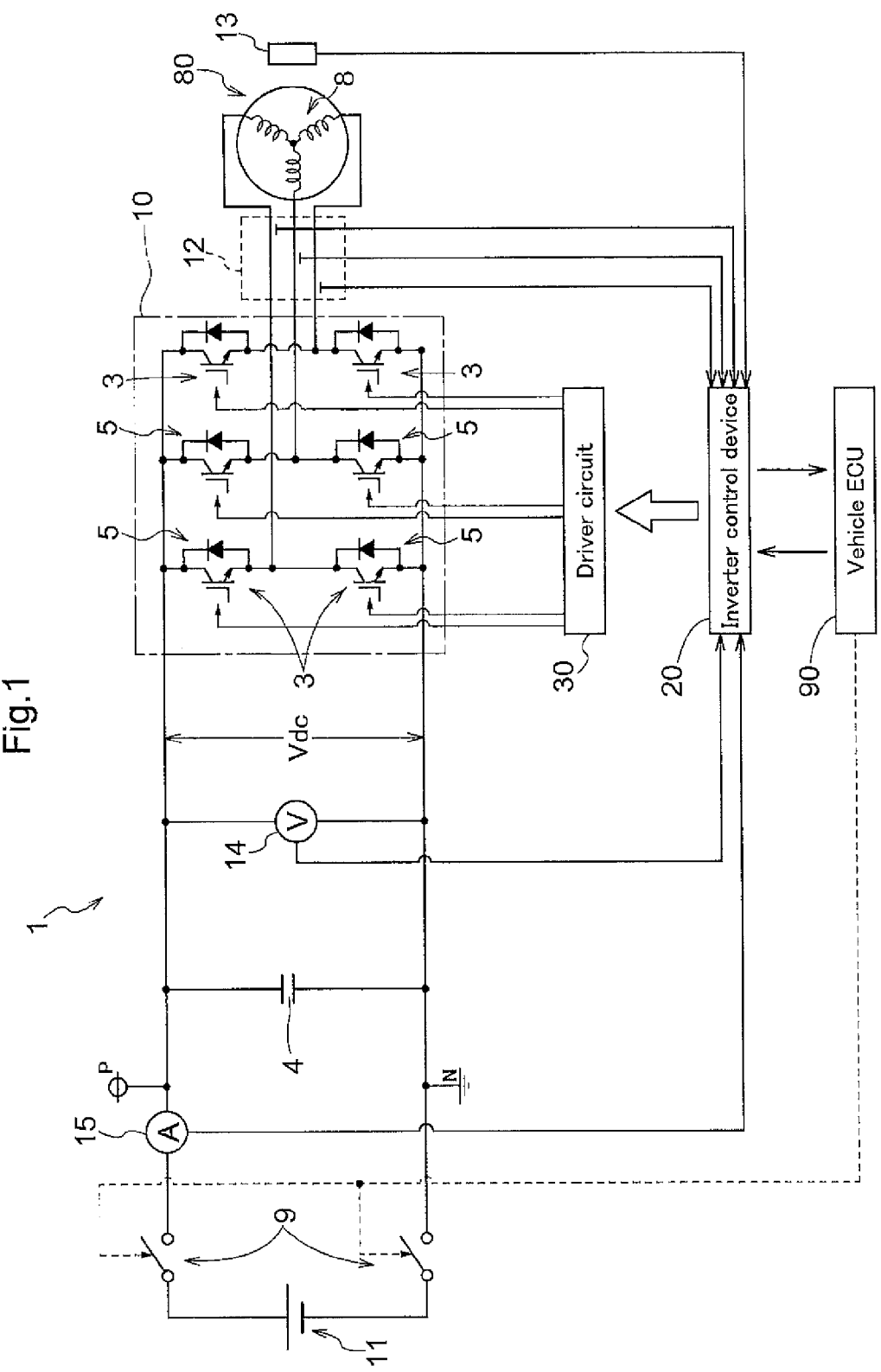
FIG. 1 is a circuit block diagram schematically showing a system configuration of an inverter control device.

Hereinafter, an embodiment of an inverter control device will be described based on the drawings. As shown in FIG. 1, an inverter control device 20 is for controlling a rotating electric machine drive device 1 that includes an inverter 10 and a DC link capacitor 4, and controls driving of a rotating electric machine 80 via the rotating electric machine drive device 1. As will be described later, the inverter 10 is a power conversion device that is connected to a DC power supply (11) via a contactor 9, is connected to the AC rotating electric machine 80, and performs power conversion between direct current and polyphase alternating current (here, three-phase alternating current), and an arm for each alternating current phase is constituted by a series circuit including an upper side switching element and a lower side switching element. The DC link capacitor 4 smooths a DC link voltage Vdc, which is the DC-side voltage of the inverter 10. The rotating electric machine 80, which is the target of driving by the rotating electric machine drive device 1 and the inverter control device 20 is a rotating electric machine that is the drive power source of a vehicle such as a hybrid automobile or an electric automobile. The rotating electric machine 80 serving as the drive power source of the vehicle is a rotating electric machine that operates using polyphase alternating current (here, three-phase alternating current), and can function as an electric motor and as a generator.

Vehicles such as automobiles, which cannot receive a supply of electrical power from an overhead line as with a railroad, are provided with a DC power supply as an electrical power supply for driving the rotating electric machine 80, examples of which include a secondary cell (battery) such as a nickel hydrogen cell or a lithium ion cell, and an electric double layer capacitor. In the present embodiment, a high voltage battery 11 (DC power supply) with a power supply voltage of 200 to 400 [V], for example, is provided as a high-voltage, high-capacity DC power supply for supplying electrical power to the rotating electric machine 80. Since the rotating electric machine 80 is an AC rotating electric machine, the inverter 10 for performing power conversion between direct current and alternating current (here, three-phase alternating current) is provided between the high-voltage battery 11 and the rotating electric machine 80. The voltage across a positive power supply line P and a negative power supply line N on the DC side of the inverter 10 is referred to hereinafter as "DC link voltage Vdc". The high-voltage battery 11 can supply electrical power to the rotating electric machine 80 via the inverter 10, and can store electrical power obtained due to power generation by the rotating electric machine 80.

A smoothing capacitor (the DC link capacitor 4) that smooths the voltage across the positive and negative electrodes on the DC side of the inverter 10 (DC link voltage Vdc) is provided between the inverter 10 and the high-voltage battery 11. The DC link capacitor 4 stabilizes the DC voltage (DC link voltage Vdc) that fluctuates according to fluctuations in the power consumption of the rotating electric machine 80. The contactor 9 that can cut the electrical connection between the high-voltage battery 11 and the circuit from the DC link capacitor 4 to the rotating electric machine 80 is provided between the DC link capacitor 4 and the high-voltage battery 11. In the present embodiment, this contactor 9 is a mechanical relay that opens and closes based on instructions from a vehicle ECU (Electronic Control Unit) 90, which is one of the highest ranking control devices of the vehicle, and the contactor 9 is referred to as the system main relay (SMR), for example. The contactor 9 enters a conductive state (connected state) with the SMR contact points closed when the ignition key (IG key) of the vehicle is in the on state (enabled state), and enters a non-conductive state (open state) with the SMR contact points open when the IG key is in the off state (non-enabled state). The inverter 10 is interposed between the high-voltage battery 11 and the rotating electric machine 80 via the contactor 9, the high-voltage battery 11 and the inverter 10 (and the rotating electric machine 80) are electrically connected when the contactor 9 is in the connected state, and the electrical connection between the high-voltage battery 11 and the inverter 10 (and the rotating electric machine 80) is cut off when the contactor 9 is in the open state.

The inverter 10 converts DC electrical power having the DC link voltage Vdc into polyphase (n phases, n being a natural number, and three phases being used here) AC electrical power and supplies it to the rotating electric machine 80, and converts AC electrical power generated by the rotating electric machine 80 into DC electrical power and supplies it to the DC power supply. The inverter 10 is configured to have multiple switching elements. It is preferable that the switching elements are power semiconductor elements capable of high frequency operation, such as an IGBT (Insulated Gate Bipolar Transistor), a power MOSFET (Metal Oxide Semiconductor Field Effect Transistor), a SiC-MOSFET (Silicon Carbide—Metal Oxide Semiconductor FET), a SiC-SIT (SiC—Static Induction Transistor), or a GaN-MOSFET (Gallium Nitride—MOSFET). As shown in FIG. 1, IGBTs 3 are used as the switching elements in the present embodiment.

For example, the inverter 10 that performs power conversion between direct current and polyphase alternating current (here, three-phase alternating current) is constituted by a bridge circuit that has arms respectively corresponding to the number of phases (here, three phases) as is widely known. Specifically, as shown in FIG. 1, two IGBTs 3 are connected in series between the DC positive side (the positive power supply line P on the positive side of the DC power supply) and the DC negative side (the negative power supply line N on the negative side of the DC power supply) of the inverter 10, thus constituting one arm. In the case of three-phase alternating current, three (for three phases) series circuits (arms) are connected in parallel. In other words, the bridge circuit is configured having one series circuit (arm) for each of the stator coils 8 respectively corresponding to the U phase, the V phase, and the W phase of the rotating electric machine 80.

Figure 3:
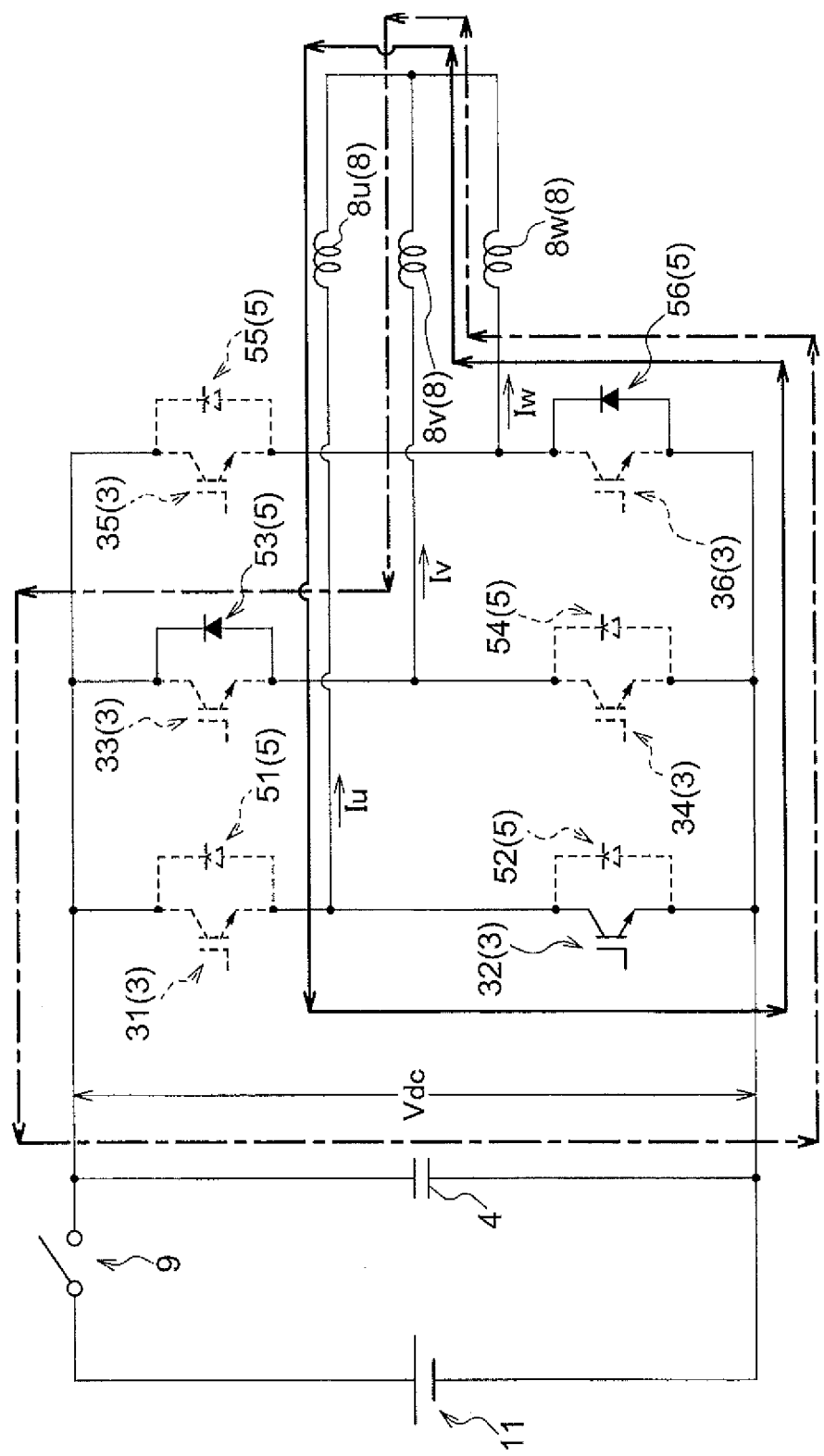
FIG. 3 is an equivalent circuit diagram showing an example of IGBT control and the flow of current in Phase1.

Intermediate points of the series circuits (arms) made up of a pair of IGBTs 3 for each phase, that is to say connection points between the IGBT 3 on the positive power supply line P side (upper side IGBTs (upper side switching elements) 31, 33, 35: see FIG. 3 for example) and the IGBT 3 on the negative power supply line N side (lower side IGBTs (lower side switching elements) 32, 34, 36: see FIG. 3 for example), are respectively connected to the stator coils 8 (8u, 8v, 8w: see FIG. 3 for example) of the rotating electric machine 80. Note that each of the IGBTs 3 is provided with a free wheel diode (FWD) 5 in parallel, with the direction from the negative electrode "N" toward the positive electrode "P" (the direction from the lower side toward the upper side) being the forward direction.

As shown in FIG. 1, the inverter 10 is controlled by the inverter control device 20. The inverter control device 20 is constructed with a logic circuit such as a microcomputer as the core member. For example, the inverter control device 20 controls the rotating electric machine 80 via the inverter 10 based on a target torque TM of the rotating electric machine 80 that is provided as a request signal from another control device or the like, such as the vehicle ECU 90, via a CAN (Controller Area Network) or the like.

The inverter control device 20 has at least two control modes, namely pulse width modulation (PWM) control and rectangular wave control (1 pulse control), as modes of the switching pattern (modes of voltage waveform control) for the IGBTs 3 that constitute the inverter 10. Also, the inverter control device 20 has, as modes of stator field control, normal field control such as maximum torque control for outputting the maximum torque with respect to the motor current and maximum efficiency control for driving the motor with maximum efficiency with respect to the motor current, and field adjustment control such as weak field control for weakening the field magnetic flux by applying a field current that does not contribute to torque and, conversely, strong field control for strengthening the field magnetic flux.

In the present embodiment, the rotating electric machine 80 is controlled by executing current feedback control using a method of current vector control in a two-axis orthogonal vector space (coordinate system) that rotates in synchronization with rotation of the rotating electric machine 80. In this current vector control method, for example, current feedback control is performed in a two-axis orthogonal vector space having a d axis that follows the direction of the field magnetic flux generated by the permanent magnet and a q axis that is electrically advanced by $\pi/2$ relative to the d axis. The inverter control device 20 determines a torque command based on the target torque TM of the rotating electric machine 80, which is the control target, and determines d axis and q axis current commands. The inverter control device 20 then obtains the deviation between the current command and the actual current flowing through the stator coils 8 of the respective phases in the rotating electric machine 80, performs a proportional-integral control operation (PI control operation) or a proportional-integral-differential control operation (PID control operation), and ultimately determines a three-phase voltage command. A switching control signal is generated based on this voltage command. Coordinate conversion between the actual three-phase space of the rotating electric machine 80 and the two-axis orthogonal vector space is performed based on the magnetic pole position detected by a rotation sensor 13 such as a resolver. Also, the rotational speed (angular velocity) and the rotational frequency [rpm] of the rotating electric machine 80 are derived based on the detection result of the rotation sensor 13. The actual current flowing through the stator coils 8 for the various phases in the rotating electric machine 80 are detected by a current sensor 12.

As described above, the switching modes of the inverter 10 include the PWM control mode and the rectangular wave control mode. PWM control is control in which a PWM waveform, which is the output voltage waveform of the inverter 10 for U, V, and W phases, is constituted by a set of pulses made up of a high level period in which the upper side switching element is in the on state and a low level period in which the lower side switching element is in the on state, and the duties of the pulses are set such that the fundamental wave component is approximately sine wave shaped in a certain period. Known examples include sinusoidal PWM (SPWM), space vector PWM (SVPWM), and overmodulation PWM control. In the present embodiment, in PWM control, the driving of the inverter 10 is controlled by controlling the armature current, which is the resultant vector of the field current (d axis current) and the drive current (q axis current) along the respective axes of the orthogonal vector space. Specifically, the inverter control device 20 controls the driving of the inverter 10 by controlling the current phase angle of the armature current in the d-q axis vector space (angle formed by the q axis current vector and the armature current vector). Accordingly, PWM control is also called current phase control.

In contrast to this, rectangular wave control (1 pulse control) is a method in which the inverter 10 is controlled by controlling the voltage phases of three-phase alternating current power. The voltage phases of the three-phase alternating current power correspond to the phases of the three-phase voltage command value. For example, rectangular wave control is rotation synchronization control in which the switching on and off of the switching elements of the inverter 10 is performed one time in each electrical angle cycle of the rotating electric machine 80, and one pulse is output in each electrical angle cycle for each phase. In rectangular wave control, the inverter 10 is driven by controlling the voltage phases of the voltages for the three phases, and thus is also called voltage phase control.

Also, as described above, the inverter control device 20 has normal field control and field adjustment control as field control modes. Normal field control, such as maximum torque control or maximum efficiency control, is a control mode that uses a basic current command value (d axis current command, q axis current command) that is set based on the target torque TM of the rotating electric machine 80.

In contrast, weak field control is a control mode in which the d axis current command in the basic current command value is adjusted so as to weaken the field magnetic flux from the stator. Also, strong field control is a control mode in which the d axis current command in the basic current command value is adjusted so as to strengthen the field magnetic flux from the stator. In weak field control, strong field control, and the like, the adjustment value for adjusting the d axis current is called the field adjustment current.

In addition to the high-voltage battery 11, the vehicle is also provided with a low-voltage battery (not shown) that is a power supply with a lower voltage than the high-voltage battery 11. The power supply voltage of the low-voltage battery is 12 to 24 [V], for example. The low-voltage battery and the high-voltage battery 11 are insulated from each other, and are in a floating relationship with respect to each other. The low-voltage battery supplies electrical power to the inverter control device 20 and the vehicle ECU 90, as well as electrical components such as an audio system, a lighting system, interior lighting, instrument lighting, and power windows, and also control devices for controlling them. The power supply voltage supplied to the vehicle ECU 90, the inverter control device 20, and the like is 5 [V] or 3.3 [V], for example.

Incidentally, the gate terminals that are the control terminals of the IGBTs 3 constituting the inverter 10 are connected to the inverter control device 20 via a driver circuit 30, and the switching thereof is controlled individually. A high voltage circuit for driving the rotating electric machine 80 and a low voltage circuit for, for example, the inverter control device 20 whose core is a microcomputer or the like have very different operating voltages (voltages supplied to the circuits). For this reason, for this reason, the driver circuit 30 (control signal drive circuit) is provided for raising and relaying the drive capability (e.g., voltage magnitude or output current, i.e., the capability to operate downstream circuits) of the gate drive signals (switching control signals) supplied to the IGBTs 3. The gate drive signals for the IGBTs 3 that were generated by the inverter control device 20, which is a low voltage circuit, pass through the driver circuit 30 and are supplied to the inverter 10 as gate drive signals for the high voltage circuit system. The driver circuit 30 is constituted using insulated elements such as photocouplers or transformers and a driver IC.

As described above, the contactor 9 enters the connected state when the vehicle ignition key (IG key) is in the on state (enabled state), and enters the open state when the IG key is in the off state (non-enabled state). During normal operation, the open/closed state of the contactor 9 is also controlled according to the state of the IG key. However, even if the IG key is in the on state, there are cases where the contactor 9 enters the open state due to a vehicle malfunction, collision, or the like. For example, if the supply of power to the contactor 9 is cut off, if an abnormality occurs in the contactor 9 drive circuit, if the contactor 9 has a mechanical malfunction due to vibration, shock, noise, or the like, or if a disconnection occurs in a contactor 9 peripheral circuit, it is possible for the contactor 9 to enter the open state. When the contactor 9 enters the open state, the supply of electrical power from the high-voltage battery 11 to the inverter 10 side is immediately cut off. Similarly, the regeneration of electrical power from the rotating electric machine 80 to the high-voltage battery 11 via the inverter 10 is also cut off by the contactor 9.

For this reason, if the contactor 9 has entered the open state, there are cases where shutdown control (SD control) is implemented to switch all of the IGBTs 3 constituting the inverter 10 to the off state. If SD control is implemented, the electrical power stored in the stator coils 8 charges the DC link capacitor 4 via the FWDs 5. For this reason, it is possible for the voltage across the terminals of the DC link capacitor 4 (DC link voltage Vdc) to rise in a short period of time. Giving the DC link capacitor 4 a higher capacitance and higher withstand voltage in order to accommodate the rise in the DC link voltage Vdc leads to an increase in the physical size of the capacitor. This also requires the inverter 10 to have a higher withstand voltage. This consequently hinders reduction of the size of the rotating electric machine drive device 1, and also influences parts cost, manufacturing cost, and product cost.

Also, when the contactor 9 has entered the open state, there are cases where active short control (active short circuit control (ASC control)) for switching some of the IGBTs 3 to the on state to allow current reflux, such as zero vector sequence control (ZVS control), is executed. The energy of the current (reflux current) is consumed by heat or the like in the IGBTs 3, the stator coils 8, and the like. Although a rise in the DC link voltage Vdc can be suppressed with ASC control, a large current flows through the IGBTs 3 and the stator coils 8. The reflux current continues to flow until the electrical power stored in the stator coils 8 is consumed, and thus there is a possibility of reducing the lifetime of the IGBTs 3 and the stator coils 8. Also, elements and the like that can handle a large current become necessary, and there is a possibility of also influencing parts cost, manufacturing cost, and product cost. Moreover, the magnetization of the permanent magnet provided on the rotor of the rotating electric machine 80 is reduced by heat generated by the large current or the like, and there is also a possibility of reducing the durability of the rotating electric machine 80.

When the contactor 9 that connects the inverter 10 and the high-voltage battery 11 has entered the open state, the inverter control device 20 of the present embodiment executes regenerative electrical power suppression control for suppressing a rise in the DC link voltage Vdc and suppressing the total amount of reflux current. In the present embodiment, later-described mixed loop control serves as the core when executing regenerative electrical power suppression control. Note that as described above, a low-voltage battery (not shown) separate from the high-voltage battery 11 is provided, and the inverter control device 20 and the vehicle ECU 90 operate using electrical power supplied from the low-voltage battery. In the description of the present embodiment, it is assumed that even if the contactor 9 enters the open state, the supply of electrical power from the low-voltage battery to the inverter control device 20 and the vehicle ECU 90 is maintained.

As shown in FIGS. 1, 3, and the like, each arm of the inverter 10 for one alternating current phase is constituted by a series circuit including an upper side switching element (upper side IGBT (31, 33, 35)) and a lower side switching element (lower side IGBT (32, 34, 36)) that are switched complementarily. In the case where the contactor 9 has entered the open state during rotation of the rotating electric machine 80, the inverter control device 20 executes mixed loop control so as to form one capacitor charging loop for charging the DC link capacitor 4 with electrical power generated by the rotating electric machine 80 and one reflux loop for causing generated electrical power to circulate between the inverter 10 and the rotating electric machine 80 (FIG. 2: Phase1, Phase2). In other words, mixed loop control is executed such that control for forming a capacitor charging loop and control for forming a reflux loop are performed at the same time. Mixed loop control is control in which one or two target switching elements among the switching elements that constitute the inverter 10 (in FIG. 3, the one U phase lower side IGBT 32) are switched to the on state. More specifically, mixed loop control is control in which only one or two target switching elements among the switching elements that constitute the inverter 10 are switched to the on state. In other words, mixed loop control is control in which only one switching element is switched to the on state as the target switching element, or control in which only two switching elements are switched to the on state as the target switching elements. The capacitor charging loop is the loop indicated by the dashed-dotted line in FIG. 3 for example, and the reflux loop is the loop indicated by the solid line in FIGS. 3 and 4 for example.

Also, in the present embodiment, after the start of mixed loop control, when the currents for all three phases become zero, the inverter control device 20 further executes shutdown control (SD control) in which all of the target switching elements are switched to the off state (Phase3).

Figure 2:
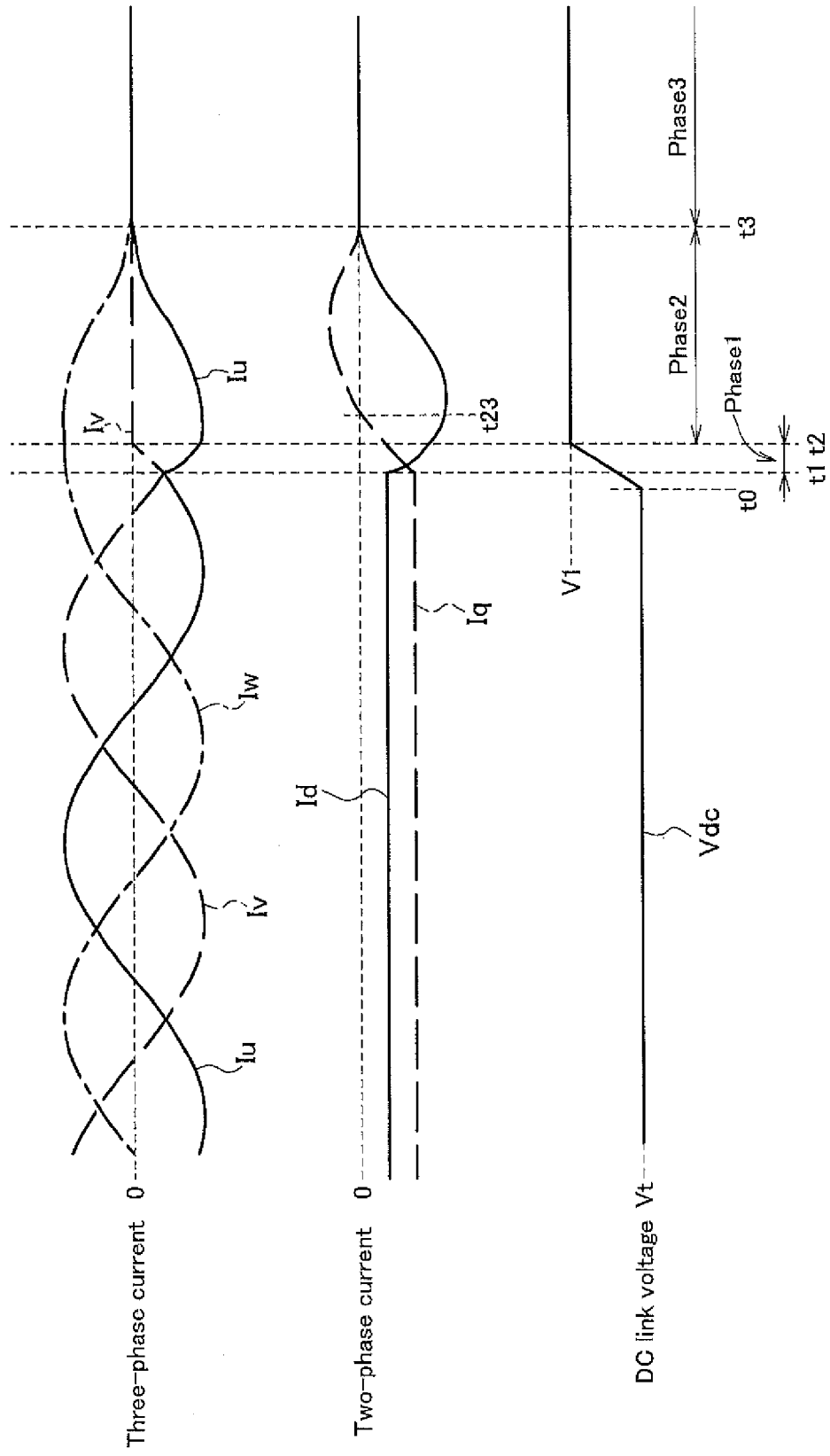
FIG. 2 is a waveform diagram schematically showing an example of control when a contactor is open.

Hereinafter, this regenerative electrical power suppression control will be described. FIG. 2 is a waveform diagram schematically showing an example of control when the contactor 9 is open, FIG. 3 is an equivalent circuit diagram showing an example of control of the IGBTs 3 and the flow of current in above-described Phase1, and FIG. 4 likewise is an equivalent circuit diagram showing an example of control of the IGBTs 3 and the flow of current in Phase2. A time "t0" shown in FIG. 2 indicates the time at which the contactor 9 enters the open state. When the contactor 9 enters the open state, the DC link voltage Vdc begins to rise. Upon determining that the contactor 9 is in the open state (contactor is open), the inverter control device 20 starts regenerative electrical power suppression control (time "t1"). The determination that the contactor is open may be made based on communication from the vehicle ECU 90, or may be made based on a detection result from a voltage sensor 14 that detects the DC link voltage Vdc, for example. Also, the determination that the contactor is open may be made based on a rapid change in the current in the high-voltage battery 11 (battery current) detected by a battery current sensor 15. Here, it is assumed that the start of regenerative electrical power suppression control is determined based on whether or not the DC link voltage Vdc detected by the voltage sensor 14 exceeds a determination threshold value for determining whether or not regenerative electrical power suppression control is necessary.

In the present embodiment, mixed loop control is executed from the time "t1" as regenerative electrical power suppression control. In mixed loop control, the target switching elements are switched to the on state, one capacitor charging loop for charging the DC link capacitor 4 with electrical power generated by the rotating electric machine 80 is formed, and one reflux loop for causing generated electrical power to circulate between the inverter 10 and the rotating electric machine 80 is formed. More specifically, in mixed loop control, only the target switching elements are switched to the on state. Since a capacitor charging loop is formed due to mixed loop control, the DC link voltage Vdc continues to rise from the time "t1" onward as well. However, when the energy stored in the stator coil 8 of the phase for which the capacitor charging loop was formed has been discharged, the capacitor charging loop is eliminated, and the rise in the DC link voltage Vdc stops at the voltage "V1" (time "t2"). The period from when regenerative electrical power suppression control (mixed loop control) starts until when the capacitor charging loop is eliminated and the rise in the DC link voltage Vdc stops is Phase1.

From the time "t2" onward, the capacitor charging loop has been eliminated, and current continues to flow in only the reflux loop. When the currents for all three phases become zero, the inverter control device 20 switches all of the target switching elements to the off state. In the present embodiment, when the current in the reflux loop becomes zero, shutdown control is executed to switch the target switching elements to the off state (time "t3"). Here, when the currents in the arms of the two phases that form the reflux loop both become zero, the inverter control device 20 switches the switching elements in the on state in the target arm to the off state. When shutdown has been implemented, the electrical power stored in the stator coils 8 charges the DC link capacitor 4 via the FWDs 5, but shutdown has been executed in the state in which all of the phase currents are zero, and therefore in the case where the DC link voltage Vdc is greater than or equal to the later-described back electromotive force, the DC link voltage Vdc does not rise. From the time "t3" onward, the currents for all of the phases are zero (Phase3). Note that it is preferable that SD control is executed at the time "t3", but this is not strictly necessary, and it need only be executed at a time around the time "t3". The execution of SD control will be late if it is executed after detection of the current becoming zero, and therefore it is preferable that SD control is executed in anticipation of the phase current becoming zero, for example.

FIG. 3 shows an example of control of the IGBTs 3 and the flow of current in Phase1. In FIG. 3, the IGBTs 3 shown by dashed lines have been switched to the off state, and the IGBTs 3 shown by solid lines have been switched to the on state. Also, the FWDs 5 shown by dashed lines are in the non-conductive state, and the FWDs 5 shown by solid lines are in the conductive state. In the present embodiment, the target switching element (later-described main target switching element) is the U phase lower side IGBT 32. Here, only the U phase lower side IGBT 32 is switched to the on state, and the other IGBTs 3 are all switched to the off state. In other words, only the later-described main target switching element is switched to the on state, and all of the other switching elements are switched to the off state. The U phase current Iu circulates in the reflux loop via the W phase lower side FWD 56. The V phase current Iv flows in the capacitor charging loop via the V phase upper side FWD 53 and the W phase lower side FWD 56, and charges the DC link capacitor 4. The W phase lower side FWD 56 is included in both the reflux loop and the capacitor charging loop, and therefore the W phase current Iw is a current with the combined magnitude of the U phase current Iu and the V phase current Iv.

Figure 4:
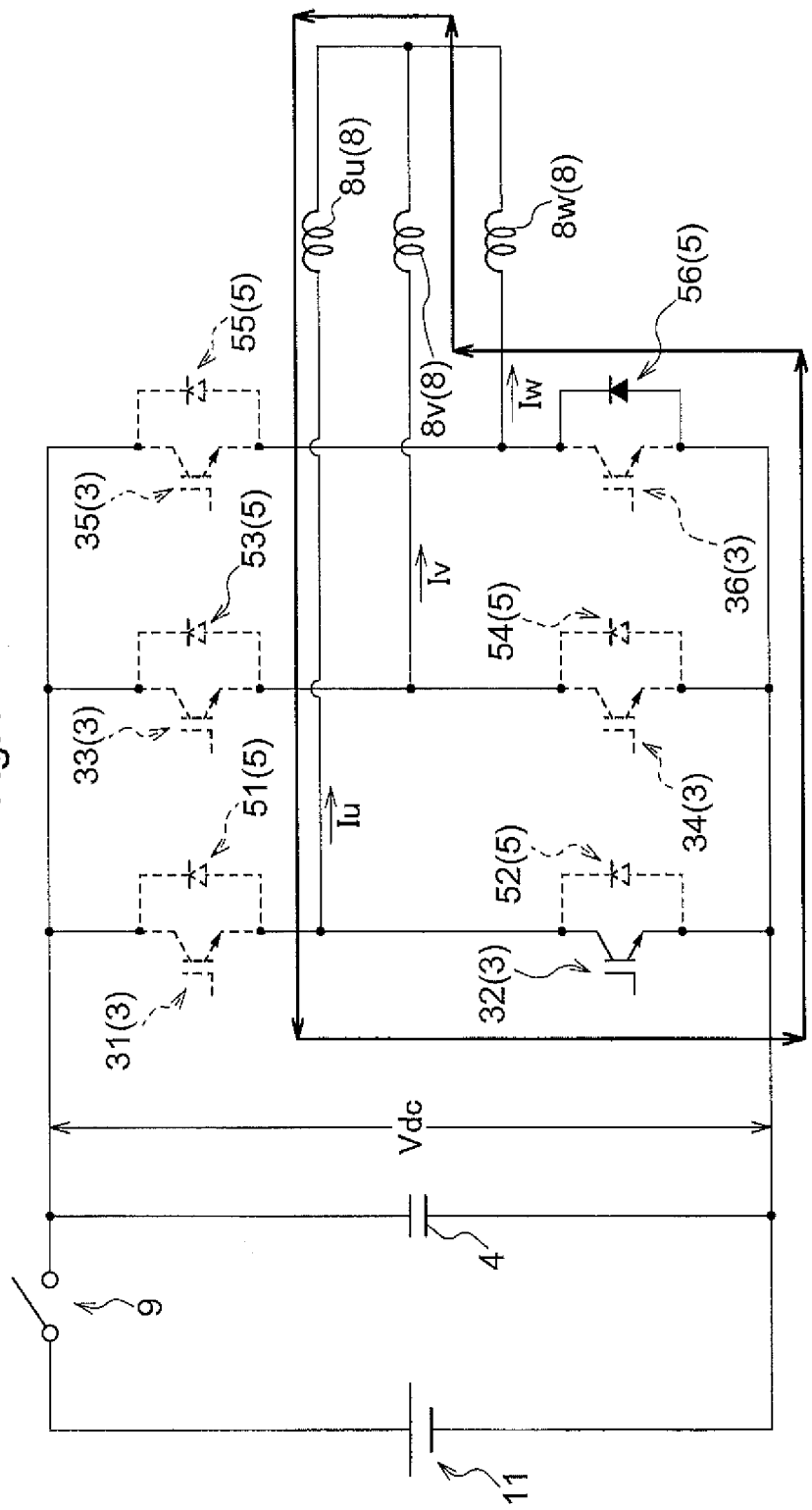
FIG. 4 is an equivalent circuit diagram showing an example of IGBT control and the flow of current in Phase2.

FIG. 4 shows an example of control of the IGBTs 3 and the flow of current in Phase2. As descried above, when the energy stored in the stator coil 8 of the phase (V phase) for which the capacitor charging loop was formed has been discharged, that current for that phase (V phase current Iv) becomes zero, and the capacitor charging loop is eliminated. Mixed loop control in which the target switching element (U phase lower side IGBT 32) is switched to the on state continues, and therefore the reflux loop is maintained. As shown in FIG. 4, the U phase current Iu flows through the U phase lower side IGBT 32, and the W phase current Iw flows through the W phase lower side FWD 56. Since the V phase current Iv has become zero, the U phase current Iu and the W phase current Iw are in equilibrium. Accordingly, as shown in FIG. 2, the U phase current Iu and the W phase current 1*w* become zero at the same time (here, the time "t3"). After the start of mixed loop control, when the current in the reflux loop becomes zero, the inverter control device 20 executes SD control. In other words, the U phase lower side IGBT 32, which is the target switching element, is switched to the off state, the reflux loop is eliminated, and all of the IGBTs 3 that constitute the inverter 10 are switched to the off state, thus shutting down the inverter 10. When shutdown has been implemented, the electrical power stored in the stator coils 8 charges the DC link capacitor 4 via the FWDs 5, but shutdown has been executed in the state in which the phase current (Iu, Iw) is zero, and therefore the DC link voltage Vdc does not rise.

Figure 5:
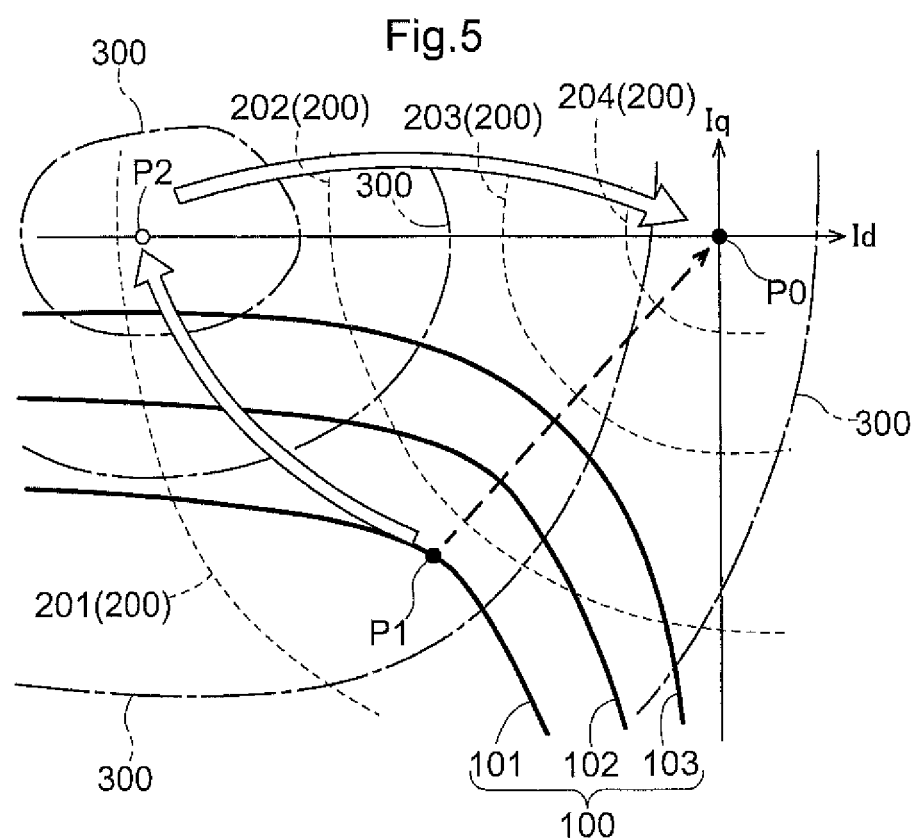
FIG. 5 is an illustrative diagram schematically showing a principle of regenerative electrical power suppression control in a current vector space.

Here, the phases in which mixed loop control is executed (Phase1 and Phase2) will be examined in a two-phase vector space (coordinate system) having the above-described d axis and q axis. FIG. 5 shows the current vector space (coordinate system). In FIG. 5, curved lines 100 (101 to 103) are each an equal torque line that indicates the vector locus of an armature current Ia (Ia^2=Id^2+Iq^2) with which the rotating electric machine 80 outputs a certain torque. The equal torque line 102 indicates a lower torque than the equal torque line 101, and the equal torque line 103 indicates a lower torque than the equal torque line 102. Curved lines 200 (201 to 204) indicate constant current circles, and a curved line 300 indicates a voltage speed ellipse (voltage limit ellipse). A constant current circle is a vector locus at which the armature current is a constant value. A voltage speed ellipse is a vector locus that indicates the range of current commands that can be set according to the rotational speed of the rotating electric machine 80 and the DC voltage (DC link voltage Vdc) value of the inverter 10. The size of the voltage speed ellipse 300 is determined based on the DC link voltage Vdc and the rotational speed (or rotation frequency) of the rotating electric machine 80. Specifically, the diameter of the voltage speed ellipse 300 is proportional to the DC link voltage Vdc, and is inversely proportional to the rotational speed of the rotating electric machine 80. The d axis and q axis current command is set to a value at an operation point on the equal torque line 100 that exists inside the voltage speed ellipse 300 in this current vector space.

Here, it is preferable that in suppressing the electrical power (charging power) supplied to the DC link capacitor 4, the d axis current that does not contribute to torque is not decreased, but rather is caused to continue to flow in a greater amount so as to increase loss (so-called high loss control). For example, the d axis current is increased while causing the torque to approach zero by reducing the q axis current from a current operation point P1. In other words, as shown by the block arrows in FIG. 5, the operation point is shifted from the current operation point P1 to an operation point P2 at which the q axis current is zero and the absolute value of the d axis current is greater than that at the operation point P1. Here, the operation point P2 is the center of the voltage speed ellipse 300. After reaching the operation point P2, the absolute value of the d axis current is reduced so as to shift the operation point to the operation point P0, as shown by the block arrows in FIG. 5. When executing control for moving from the operation point P1 to the operation point P0 via the operation point P2, it is preferable that the above-described field adjustment function is also utilized. In FIG. 2, the period from the time "t1" to the time "t23" is the period in which the operation point is shifted from the operation point P1 to the operation point P2 in FIG. 5. Also, the period from the time "t23" to the time "t3" is the period in which the operation point is shifted from the operation point P2 to the operation point P0 in FIG. 5.

Figure 6:
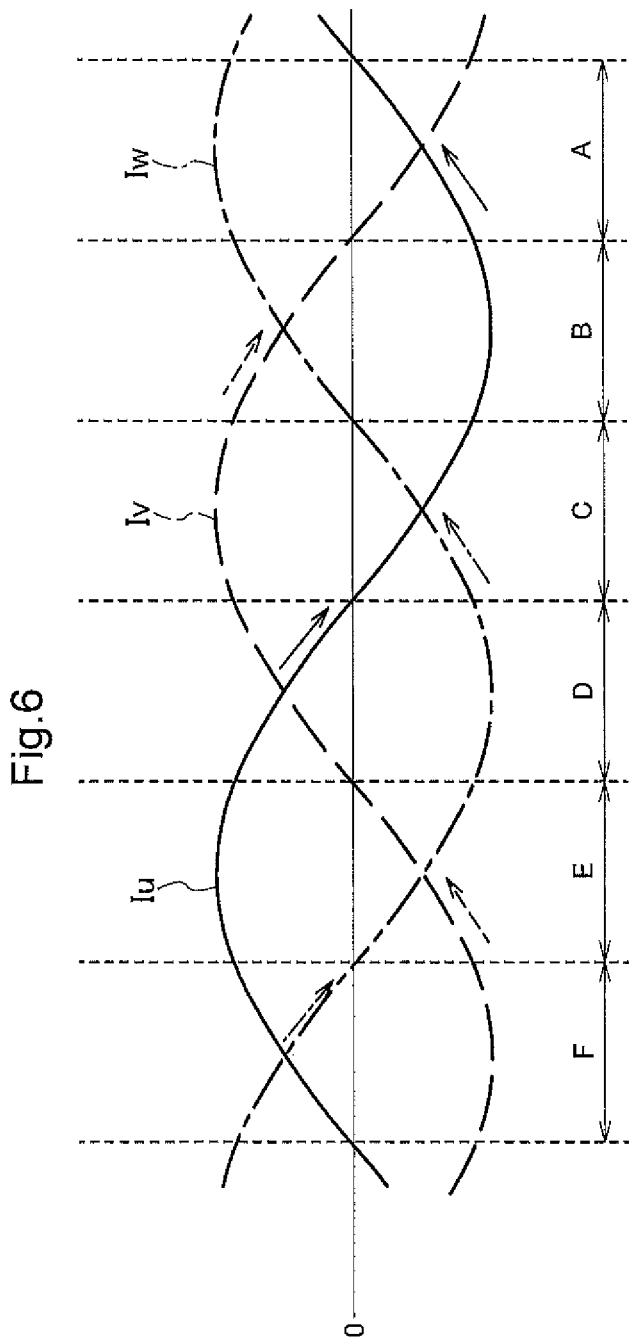
FIG. 6 is an illustrative diagram showing a relationship between three phase current waveforms and a target arm.

Incidentally, as described above, in mixed loop control, the IGBT 3 that is the target switching element among the IGBTs 3 that constitute the inverter 10 is switched to the on state. It is preferable that this target switching element is selected using a criterion such as the following. The following describes a criterion for selecting one target switching element (later-described main target switching element). As shown in FIG. 6, it is preferable that when execution of mixed loop control is started, in the case where the current waveforms of two phases out of the three phases are on the positive side of the amplitude center, out of these two phases, the upper side switching element of the phase in which the current waveform is descending is set as the target switching element. Also, it is preferable that when execution of the mixed loop control is started, in the case where the current waveforms of two phases out of the three phases are on the negative side of the amplitude center, out of these two phases, the lower side switching element of the phase in which the current waveform is rising is set as the target switching element.

For example, in "A" in FIG. 6, when execution of mixed loop control is started (time "t1"), the current waveforms of the U phase and the V phase out of the three phases are on the negative side of the amplitude center, and therefore out of the U phase and the V phase, the U phase lower side IGBT 32 that is the lower side switching element of the U phase in which the current waveform is rising is set as the target switching element. In the mode illustrated in FIGS. 2 to 4, the target switching element is determined according to this selection criterion.

Table 1 below shows the waveforms of the currents for the three phases, and the on/off states of the IGBTs 3. As shown in Table 1, there are six states according to the waveforms of the currents for the three phases (Iu, Iv, Iw). These states are indicated under "Sector". In this table, "Su+, Sv+, Sw+, Su−, Sv−, Sw−" respectively indicate the U phase upper side IGBT 31, the V phase upper side IGBT 33, the W phase upper side IGBT 35, the U phase lower side IGBT 32, the V phase lower side IGBT 34, and the W phase lower side IGBT 36. Specifically, "S" indicates "switching element", the indices "u, v, w" indicate the three phases, "+" indicates "upper side", and "−" indicates "lower side". Also, "0" in the table indicates the off state, and "1" indicates the on state.

Table 1: relationship between three phase currents and target switching elements (main target switching element) (relationship between three phase currents and target switching element in later-described single phase switching control)

TABLE 1

| Sector | Iu | Iv | Iw | Su+ | Sv+ | Sw+ | Su− | Sv− | Sw− |
|---|---|---|---|---|---|---|---|---|---|
| 1 | + | − | + | 0 | 0 | 1 | 0 | 0 | 0 |
| 2 | + | − | − | 0 | 0 | 0 | 0 | 1 | 0 |
| 3 | + | + | − | 1 | 0 | 0 | 0 | 0 | 0 |
| 4 | − | + | − | 0 | 0 | 0 | 0 | 0 | 1 |
| 5 | − | + | + | 0 | 1 | 0 | 0 | 0 | 0 |
| 6 | − | − | + | 0 | 0 | 0 | 1 | 0 | 0 |

According to the condition described above, as shown in FIG. 6, determination phases (A to F) in which the six upper side and lower side IGBTs (31 to 36) of the three phases are selected appear without overlap at each electrical angle of 60 degrees. Specifically, the target switching element that is set is the U phase lower side IGBT 32 in "A", the V phase upper side IGBT 33 in "B", the W phase lower side IGBT 36 in "C", the U phase upper side IGBT 31 in "D", the V phase lower side IGBT 34 in "E", and the W phase upper side IGBT 35 in "F". Accordingly, an appropriate IGBT 3 (31 to 36) can be set as the target switching element regardless of the situation.

In other words, it is preferable that the current in one of the two phases is caused to flow in the reflux loop, and the current in the other phase is caused to flow in the capacitor charging loop, and therefore it is preferable that the target switching element is selected from the side of the amplitude center on which the current waveforms of two phases exist. If all of the switching elements are in the off state, and the currents of two phases are flowing on the negative side, the upper side free wheel diodes in those two phases are in the conductive state. In order to change the direction of the current flowing in the arm of one of these phases so as to be reflux current, it is sufficient to switch on the lower side switching element in one of these two phases. In other words, it is sufficient to switch on the lower side switching element in one of the two phases such that the upper side free wheel diode enters the non-conductive state in that phase. On the other hand, if all of the switching elements are in the off state, and the currents of two phases are flowing on the positive side, the lower side free wheel diodes in those two phases are in the conductive state. If the upper side switching element in one phase out of those two phases is switched on, the direction of the current flowing in the arm of that phase will change so as to be reflux current. Accordingly, it is sufficient to switch on the upper side switching element of that phase such that the lower side free wheel diode of that phase enters the non-conductive state.

Figure 7:
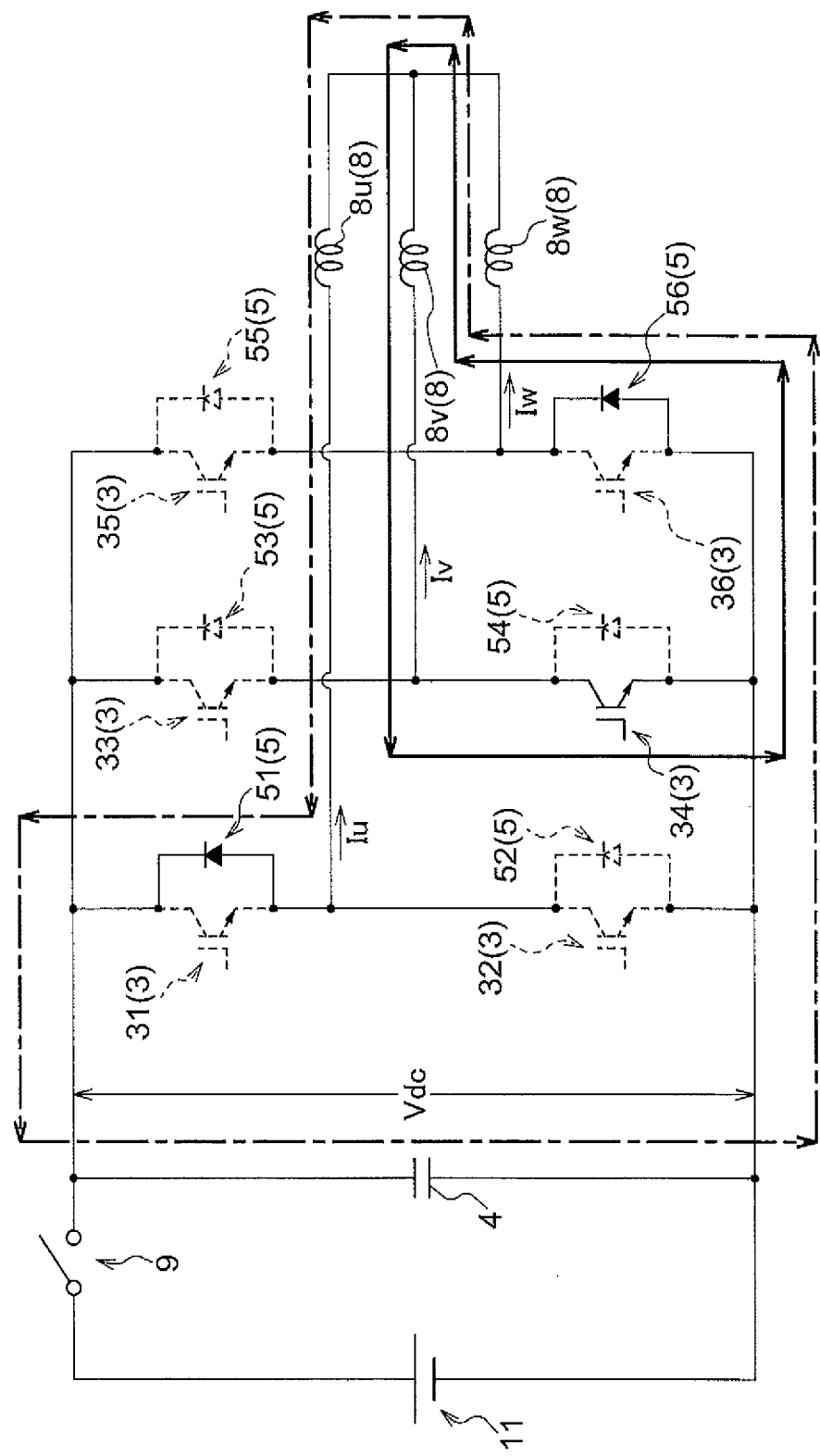
FIG. 7 is an equivalent circuit diagram showing another example of IGBT control and the flow of current in Phase1.

For example, if all of the IGBTs 3 are in the off state, and two phase currents, namely the U phase current Iu and the V phase current Iv are flowing on the negative side, the U phase upper side FWD 51 and the V phase upper side FWD 53 are in the conductive state. This is a state in which two capacitor charging loops are formed. Here, if the direction of the current flowing in either the U phase arm or the V phase arm is changed, one of the capacitor charging loops is eliminated, and one reflux loop is formed. In order to change the direction of the current flowing in either the U phase arm or the V phase arm, in both of which the current is flowing via FWDs 5, out of the upper side and the lower side, it is sufficient to switch on an IGBT 3 on the side opposite to the side on which the current is flowing via the FWD 5. Accordingly, in the case where the U phase upper side FWD 51 and the V phase upper side FWD 53 are in the conductive state, it is sufficient to switch on either the U phase lower side IGBT 32 or the V phase lower side IGBT 34. FIG. 3 (and FIG. 4) shows an example of a mode in which the U phase lower side IGBT 32 is switched on as the target switching element (main target switching element), and FIG. 7 shows an example of a mode in which the V phase lower side IGBT 34 is switched on as the target switching element (main target switching element).

Specifically, as illustrated in FIG. 2, when mixed loop control is executed (time "t1"), the increasing/decreasing directions of the U phase current Iu and the V phase current Iv reverse. If mixed loop control is executed in the first half (range from 0 to 30 degrees) in the determination phases (A to F) for each electrical angle of 60 degrees, the current that is flowing in the capacitor charging loop and reaches zero earlier is the V phase current Iv. In the case where mixed loop control is executed in the first half (range of 0 to 30 degrees) of each of the determination phases (A to F), a rise in the DC link voltage Vdc can be suppressed in the case where the V phase current Iv is caused to flow in the capacitor charging loop, and the U phase current Iu is caused to flow in the reflux loop. Accordingly, as one mode, it is preferable that the U phase lower side IGBT 32 is set as the target switching element such that the U phase current Iu flows in the reflux loop. The U phase lower side IGBT 32 is the lower side switching element of the phase in which the current waveform is rising, out of the two phases in which the current waveform is on the negative side of the amplitude center.

Figure 8:
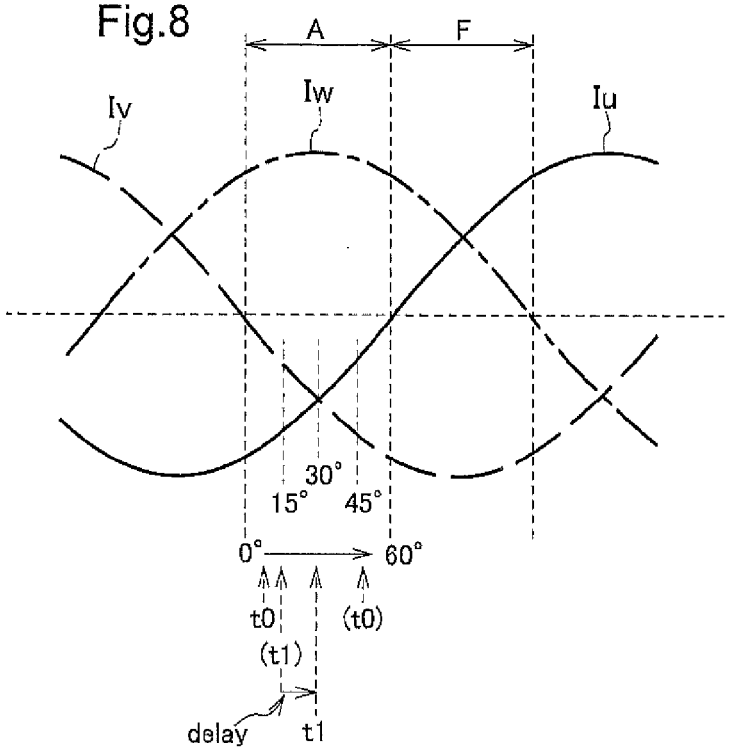
FIG. 8 is an illustrative diagram showing a relationship between contactor opening and the start of mixed loop control.

Although a person skilled in the art could infer this based on the above description, the ratios of the currents flowing in the capacitor charging loop and the reflux loop vary depending on the timing at which execution of mixed loop control is started. Accordingly, the amount of rise in the DC link voltage Vdc and the magnitude of the reflux current vary depending on the timing at which execution of mixed loop control is started. According to simulations performed by the inventors, for example, as shown in FIG. 8, in the case where the time "t1" at which mixed loop control is executed is the time point at 30 degrees in the determination phase "A", compared to the case of being the time point at 15 degrees, the risen voltage of the DC link voltage Vdc was ⅓ to ¼, and the highest value of the phase current was a multiple of 1.2 to 2. The simulations were performed such that the rated current and withstand voltage are satisfied under the conditions of the maximum regenerative electrical power point and maximum voltage of the inverter 10.

In this way, the values of the DC link voltage Vdc and the phase current vary depending on the timing at which mixed loop control is started. For example, in the case of a desire to further suppress a rise in the DC link voltage Vdc, in the case where the contactor 9 enters the open state at the time "t0" shown in FIG. 7, even though it is possible to start mixed loop control at the time point at the electrical angle of 15 degrees in the determination phase, a delay may be set, and mixed loop control may be started at the time point at the electrical angle of 30 degrees. Also, it is preferable that in the case where it is determined that the contactor 9 entered the open state or where it becomes possible to start mixed loop control at a time near the end of the determination phase, such as a time point at the electrical angle of 50 degrees or higher, the target switching element is set not based on the determination criterion in that determination phase, but rather based on the determination criterion of the next determination phase (e.g., "F" after "A").

Note that as shown in FIG. 2, after the contactor 9 has entered the open state, the inverter control device 20 shifts the control mode from three-phase drive control for performing power conversion between direct current and three-phase alternating current to mixed loop control without performing SD control or ASC control therebetween. Accordingly, a sudden rise in the DC link voltage Vdc due to SD control and large current reflux due to ASC control are suppressed. Note that the above-described PWM control and rectangular wave control are included in three-phase drive control. Also, there is no need for all three phases to be modulated at all times, and three-phase drive control also includes two-phase modulation in which the fixing of any one phase and the modulation of the other two phases is repeated.

As described above, by performing mixed loop control, it is possible to suppress a rise in the DC link voltage of the inverter and suppress the total amount of reflux current, while also being able to set the current flowing in the rotating electric machine 80 to zero even in the state in which the rotational speed of the rotating electric machine is not zero. In other words, by combining SD control and ASC control, it is possible to execute control for appropriately setting the current flowing in the rotating electric machine 80 to zero. As described above, according to simulations performed by the inventors, it was confirmed that compared to the case of simply executing SD control in response to the contactor open state, the risen voltage of the DC link voltage Vdc is reduced to approximately ⅕ to ⅖ even if the capacitance of the DC link capacitor 4 is reduced to approximately ½, for example. In other words, a rise in the DC link voltage Vdc is suppressed by regenerative electrical power suppression control, and it is also possible to reduce the size of the DC link capacitor 4.

Also, compared to the case of simply executing ASC control in response to the contactor open state, the highest value of the phase current falls within approximately ⅓ to ⅔. In other words, phase current is also suppressed by regenerative electrical power suppression control. Accordingly, reduction in the lifetime of the stator coils 8 and the IGBTs 3 due to being worn down can be suppressed. In other words, through simulations, it was confirmed that the rated current and withstand voltage are satisfied under the conditions of the maximum regenerative electrical power point and maximum voltage of the inverter 10.

Figure 9:
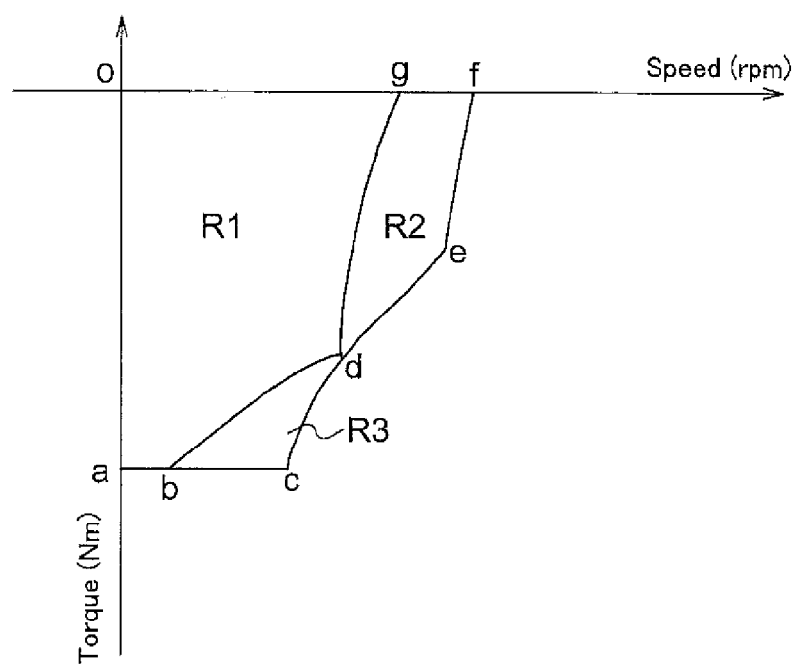
FIG. 9 is a diagram showing a relationship between a control method applied at the time of contactor opening and the operating state of a rotating electric machine.

It can be said that the inverter control device 20 of the present embodiment, which executes mixed loop control, combines SD control and ASC control to execute regenerative electrical power suppression control (SD-ASC combined control) for appropriately setting the current flowing in the rotating electric machine 80 to zero. SD control, ASC control, and SD-ASC combined control each have an appropriate region according to the operating state of the rotating electric machine 80 at the time of contactor opening. FIG. 9 shows regions in which the respective control methods are appropriate in an operation map represented by the rotational speed and the torque of the rotating electric machine 80. In the region with a high rotational speed, which is the region "defg" (region "R2") in FIG. 9, the electromotive force (EMF) of the rotating electric machine 80 is high, and therefore ASC control is appropriate. The line "dg" indicates the boundary at which the back electromotive force (BEMF) reaches or exceeds the DC link voltage Vdc. In the region with a low rotational speed, which is the region "0acdg" (region "R1+R3") in FIG. 9, SD control is appropriate. In other words, SD control is executed in the case where the DC link voltage Vdc is higher than the electromotive force generated by the rotating electric machine 80.

If the inverter control device 20 is constructed such that SD control can be performed in the entirety of the region "0acdg" in which SD control is appropriate, it is necessary to perform design in view of the rise in the DC link voltage Vdc in that region. For example, the switching elements such as the IGBTs 3 are required to have a high withstand voltage, and the DC link capacitor 4 is also required to have a high capacitance and high withstand voltage. However, if the rise in the DC link voltage Vdc can be suppressed in the region "bcd" (region "R3") with a high rotational speed and torque, these demands can be mitigated. Accordingly, it is preferable that the above-described regenerative electrical power suppression control is applied in the region "bcd" (region "R3") in FIG. 9.

Other Embodiments

Hereinafter, other embodiments will be described. Note that the configurations of the embodiments described below are not limited to being applied on their own, and they can be applied in combination with the configurations of other embodiments as long as no contradiction arises.

(1) Although an aspect in which shutdown control is executed after the start of mixed loop control is described above, a configuration is possible in which shutdown control is not executed, and mixed loop control is continued. In other words, a configuration is possible in which only the reflux loop is maintained, and partial active short control is executed.

(2) In the above description, an example is described in which, when execution of mixed loop control is started, if the current waveforms of two phases out of the three phases are on the negative side of the amplitude center, out of the two phases, the lower side switching element of the phase in which the current waveform is rising is set as the target switching element (main target switching element) (see FIGS. 2 to 4). Also, it was described that it is preferable that the following aspect described with reference to FIG. 6 is the criterion for selecting the target switching element (main target switching element). Specifically, it was described that it is preferable that when execution of mixed loop control is started, if the current waveforms of two phases out of the three phases are on the positive side of the amplitude center, out of the two phases, the upper side switching element of the phase in which the current waveform is descending is set as the target switching element (main target switching element), and when execution of mixed loop control is started, if the current waveforms of two phases out of the three phases are on the negative side of the amplitude center, out of the two phases, the lower side switching element of the phase in which the current waveform is rising is set as the target switching element (main target switching element). However, a configuration is possible in which in the case where the current waveforms of two phases out of the three phases are on the positive side of the amplitude center, the upper side switching element of either phase out of the two phases is set as the target switching element (main target switching element). For example, the upper side switching element of the phase in which the current waveform is rising may be set as the target switching element (main target switching element). Similarly, a configuration is possible in which in the case where the current waveforms of two phases out of the three phases are on the negative side of the amplitude center, the lower side switching element of either phase out of the two phases is set as the target switching element (main target switching element). In other words, the upper side switching element of the phase in which the current waveform is descending may be set as the target switching element (main target switching element).

Figure 10:
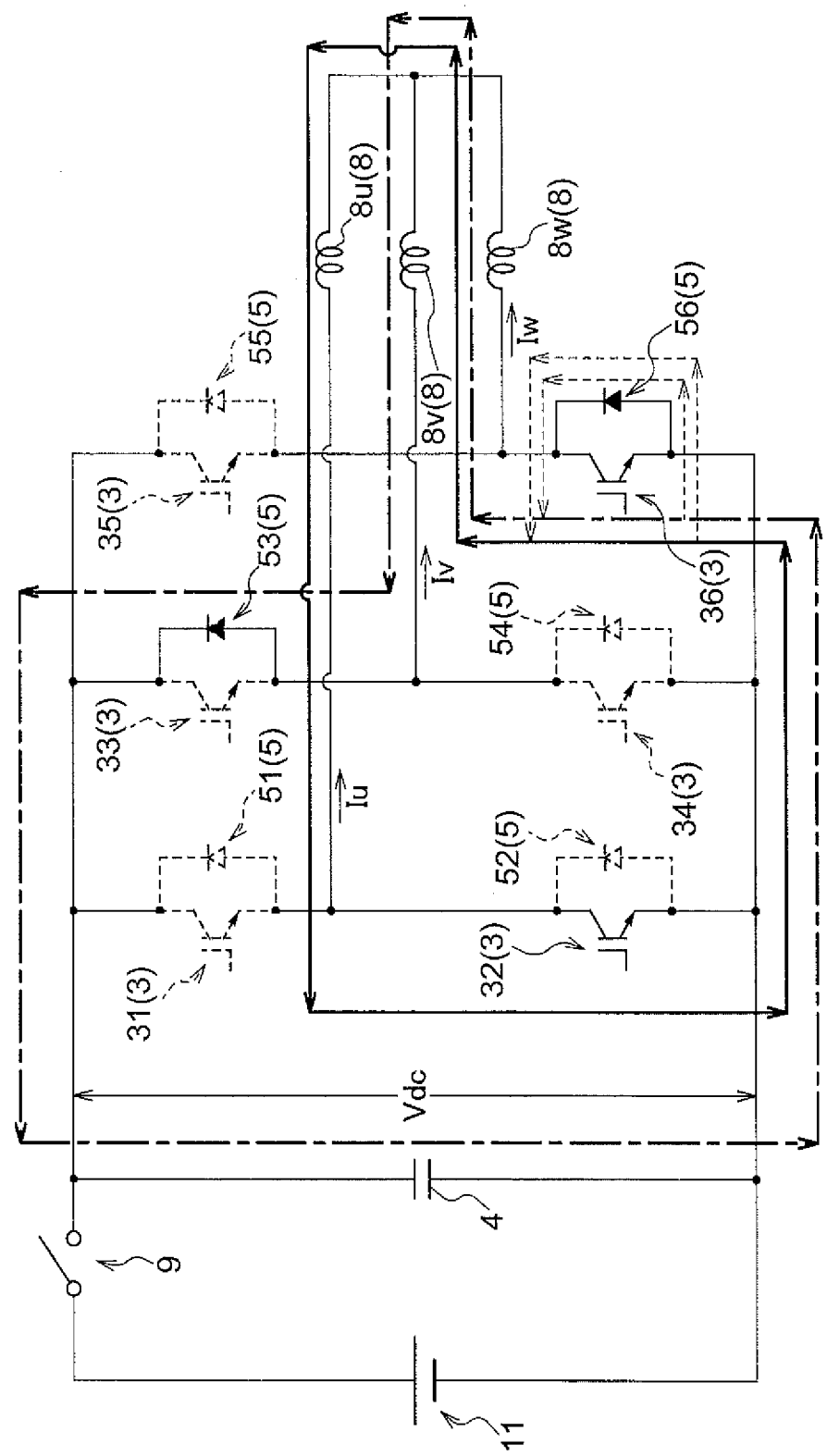
FIG. 10 is an equivalent circuit diagram showing another example of IGBT control and the flow of current in Phase1.

Incidentally, as shown in FIG. 3 (and FIG. 4), even if not only the U phase lower side IGBT 32, but also the W phase lower side IGBT 36 is set to the on state, a similar reflux loop and capacitor charging loop are formed. Specifically, since the W phase lower side FWD 56 is in the conductive state, the W phase lower side arm becomes conductive regardless of whether the W phase lower side IGBT 36 is in the on or off state, and there is no problem even if the W phase lower side IGBT 36 is switched on. Accordingly, in the case of the aspect illustrated in FIG. 3, the W phase lower side IGBT 36 can also function as the target switching element. FIG. 10 shows an example in which the U phase lower side IGBT 32 and the W phase lower side IGBT 36 are set to the on state as the target switching elements so as to form a reflux loop and a capacitor charging loop. It should be noted that although it is necessary to switch the U phase lower side IGBT 32 to the on state as the target switching element since the U phase lower side FWD 52 connected thereto in parallel is in the non-conductive state, it is not necessary to switch the W phase lower side IGBT 36 to the on state since the W phase lower side FWD 56 connected thereto in parallel is already in the conductive state. Accordingly, the U phase lower side IGBT 32 that needs to be set to the on state is called the main target switching element, and the W phase lower side IGBT 36 that does not need to be set to the on state is called the sub target switching element.

In other words, in the case where the contactor 9 has entered the open state during rotation of the rotating electric machine 80, the inverter control device 20 executes mixed loop control in which one or two target switching elements out of the switching elements (IGBTs 3) that constitute the inverter 10 are switched to the on state so as to form one capacitor charging loop for charging the DC link capacitor 4 with electrical power generated by the rotating electric machine 80 and one reflux loop for causing generated electrical power to circulate between the inverter 10 and the rotating electric machine 80. Here, the target switching elements include a main target switching element and a sub target switching element. Specifically, the inverter control device 20 executes mixed loop control for switching on one main target switching element, or one main target switching element and one sub target switching element. In other words, the inverter control device 20 executes mixed loop control in which at least one main target switching element is set to the on state as the target switching element. Also, the inverter control device 20 may execute mixed loop control for switching a sub target switching element to the on state in addition to the main target switching element. In other words, the inverter control device 20 can execute mixed loop control in which only one switching element (main target switching element) out of the six upper side and lower side switching elements of the three phases that constitute the inverter 10 is switched to the on state, or mixed loop control in which only two switching elements (main target switching element and sub target switching element) out of the switching elements that constitute the inverter 10 are switched to the on state.

Table 2 below shows the waveforms of the currents for the three phases and the on/off states of the IGBTs 3, similarly to Table 1 described above. Table 1 shows an example of the case of executing mixed loop control in which only one switching element (main target switching element) out of the six upper side and lower side switching elements of the three phases that constitute the inverter 10 is switched to the on state. On the other hand, Table 2 shows an example of the case of executing mixed loop control in which only two switching elements (main target switching element and sub target switching element) out of the switching elements that constitute the inverter 10 are switched to the on state. The notations in Table 2 are similar to those in Table 1, and therefore will not be described here.

Table 2: relationship between three phase currents and target switching elements (main and sub target switching elements) (relationship between three phase currents and target switching elements in later-described two phase switching control)

TABLE 2

| Sector | Iu | Iv | Iw | Su+ | Sv+ | Sw+ | Su− | Sv− | Sw− |
|---|---|---|---|---|---|---|---|---|---|
| 1 | + | − | + | 0 | 1 | 1 | 0 | 0 | 0 |
| 2 | + | − | − | 0 | 0 | 0 | 1 | 1 | 0 |
| 3 | + | + | − | 1 | 0 | 1 | 0 | 0 | 0 |
| 4 | − | + | − | 0 | 0 | 0 | 0 | 1 | 1 |
| 5 | − | + | + | 1 | 1 | 0 | 0 | 0 | 0 |
| 6 | − | − | + | 0 | 0 | 0 | 1 | 0 | 1 |

To summarize the above, when execution of mixed loop control is started, in the case where the current waveforms of two phases out of the three phases are on the positive side of the amplitude center, the upper side switching element of one out of the two phases is set as the main target switching element, and when execution of mixed loop control is started, in the case where the current waveforms of two phases out of the three phases are on the negative side of the amplitude center, the lower side switching element of one out of the two phases is set as the main target switching element. Preferably, as was described above with reference to FIG. 6, when execution of mixed loop control is started, if the current waveforms of two phases out of the three phases are on the positive side of the amplitude center, out of the two phases, the upper side switching element of the phase in which the current waveform is descending is set as the main target switching element, and when execution of mixed loop control is started, if the current waveforms of two phases out of the three phases are on the negative side of the amplitude center, out of the two phases, the lower side switching element of the phase in which the current waveform is rising is set as the main target switching element. Also, when execution of mixed loop control is started, if the current waveforms of two phases out of the three phases are on the positive side of the amplitude center, the upper side switching element of the phase other than the two phases is set as the sub target switching element, and when execution of mixed loop control is started, if the current waveforms of two phases out of the three phases are on the negative side of the amplitude center, the lower side switching element of the phase other than the two phases is set as the sub target switching element. Note that mixed loop control executed by setting only the main target switching element to the on state can be called single phase switching control, and mixed loop control executed by setting the main target switching element and the sub target switching element to the on state can be called two phase switching control.

(3) As described above, when the contactor 9 enters the open state, the DC link voltage Vdc rises immediately. Accordingly, it is preferable that the inverter control device 20 swiftly determines that the contactor 9 entered the open state and starts regenerative electrical power suppression control. Accordingly, in the example described above, it can be swiftly determined that the contactor 9 entered the open state based on a result of detection of the DC link voltage Vdc, without acquiring the state of the contactor 9 via the vehicle ECU 90 using a CAN or the like that generally requires time for communication. Also, another configuration is possible in which the opening of the contactor is determined based on a rapid change in the current of the high-voltage battery 11 (battery current), which is detected by the battery current sensor 15 provided between the high-voltage battery 11 and the DC link capacitor 4. When the contactor 9 enters the open state, a rapid change occurs in the state of the electrical connection between the high-voltage battery 11 and the circuits downstream thereof (DC link capacitor 4, inverter 10, rotating electric machine 80, etc.). For this reason, the current entering/exiting the high-voltage battery 11 also changes rapidly. Accordingly, in this case as well, the fact that the contactor 9 entered the open state can be detected by the inverter control device 20 more swiftly based on the result of detecting the current of the high-voltage battery 11 than by acquiring the state of the contactor 9 via the vehicle ECU 90 using a CAN or the like. In this way, swiftly detecting the opening of the contactor is particularly important in order to prevent the voltage (DC link voltage Vdc) across the terminals of the smoothing capacitor (DC link capacitor 4) from rising in a short time due to the opening of the contactor.

Overview of Embodiments

The following is a brief description of an overview of the inverter control device (20) according to the embodiments described above.

An inverter control device according to a preferable embodiment is an inverter control device (20) for controlling a rotating electric machine drive device (1) that drives an alternating current rotating electric machine (80) and includes an inverter (10) and a DC link capacitor (4), the inverter (10) being connected to a DC power supply (11) via a contactor (9), being connected to the rotating electric machine (80), and performing power conversion between direct current and three-phase alternating current, and the DC link capacitor (4) smoothing a DC link voltage (Vdc), which is a DC-side voltage of the inverter (10), and the inverter control device (20) performing switching control on switching elements (3) that constitute the inverter (10), wherein in a case where the contactor (9) has entered an open state during rotation of the rotating electric machine (80), mixed loop control is executed for switching one or two target switching elements out of the switching elements (3) that constitute the inverter (10) to an on state so as to form one capacitor charging loop for charging the DC link capacitor (4) with electrical power generated by the rotating electric machine (80) and form one reflux loop for causing the generated electrical power to circulate between the inverter (10) and the rotating electric machine (80).

According to this configuration, after the contactor (9) has entered the open state, mixed loop control is executed so as to form one capacitor charging loop and one reflux loop. In other words, mixed loop control is executed such that shutdown control for forming a capacitor charging loop and active short control for forming a reflux loop are performed at the same time. There is an issue in that although reflux current can be suppressed in shutdown control, the voltage across the terminals of the DC link capacitor (4) (DC link voltage (Vdc)) rises significantly, and although a rise in the DC link voltage (Vdc) can be suppressed in active short control, large current reflux continues to occur. However, if shutdown control and active short control are executed concurrently as in this configuration, it is possible to suppress a rise in voltage caused by shutdown control and suppress a large current generated by active short control. In this way, according to this configuration, in the case where the contactor (9) that connects the inverter (10) and the DC power supply (11) has entered the open state, it is possible to suppress a rise in the DC link voltage (Vdc) of the inverter (10) and suppress the total amount of reflux current, while also setting the current flowing in the rotating electric machine (80) to zero even in the state where the rotational speed of the rotating electric machine (80) is not zero.

As one aspect, it is preferable that after the mixed loop control has started, when the currents of the three phases all become zero (reach the vicinity of zero), the inverter control device (20) further executes shutdown control to switch all of the target switching elements to an off state. At the time of transition from mixed loop control to shutdown control, the current in the arm that is to be shut down, that is to say the current in the arm that forms the reflux loop, is zero, thus suppressing the case of leading to a rise in the DC link voltage (Vdc) due to shutdown. Also, since the reflux loop is eliminated, the wearing down of the switching elements (3) and the stator coils (8) of the rotating electric machine (80) due to reflux current continuing to flow is also suppressed.

As one aspect, it is preferable that the inverter control device (20) executes the mixed loop control in which at least one main target switching element is switched to the on state as the target switching element. In general, in an inverter, an arm for each alternating current phase is constituted by a series circuit including an upper side switching element and a lower side switching element, and in the case where the inverter (10) that is the target of control of the inverter control device (20) has such a configuration, it is preferable that the main target switching element is set as follows. Specifically, when execution of the mixed loop control is started, in a case where current waveforms of two phases out of the three phases are on a positive side of an amplitude center, the upper side switching element of one out of the two phases is set as the main target switching element, and when execution of the mixed loop control is started, in a case where current waveforms of two phases out of the three phases are on a negative side of the amplitude center, the lower side switching element of one out of the two phases is set as the main target switching element, and when execution of the mixed loop control is started, in a case where current waveforms of two phases out of the three phases are on a negative side of the amplitude center, the lower side switching element of one out of the two phases is set as the main target switching element. According to this condition, the main target switching element is determined at each electrical angle of 60 degrees. Accordingly, an appropriate switching element (3) can be set as the main target switching element regardless of the situation.

Furthermore, it is preferable that when execution of the mixed loop control is started, in a case where current waveforms of two phases out of the three phases are on the positive side of the amplitude center, out of the two phases, the upper side switching element of a phase in which the current waveform is descending is set as the main target switching element, and when execution of the mixed loop control is started, in a case where current waveforms of two phases out of the three phases are on the negative side of the amplitude center, out of the two phases, the lower side switching element of a phase in which the current waveform is rising is set as the main target switching element. According to this condition, a situation in which each of the six upper side and lower side switching elements for the three phases are selected appears at each electrical angle of 60 degrees without redundancy. Accordingly, an appropriate switching element can be set as the target switching element regardless of the situation.

As described above, the inverter control device (20) executes mixed loop control in which one or two target switching elements among the switching elements (3) that constitute the inverter (10) are switched to the on state. It is preferable that in the case where the inverter control device (20) executes the mixed loop control in which at least one main target switching element is switched to the on state as the target switching element, the inverter control device (20) executes the mixed loop control in which a sub target switching element is set to the on state in addition to the main target switching element. Here, it is preferable that when execution of the mixed loop control is started, in a case where current waveforms of two phases out of the three phases are on the positive side of the amplitude center, the upper side switching element of a phase different from the two phases is set as the sub target switching element, and when execution of the mixed loop control is started, in a case where current waveforms of two phases out of the three phases are on the negative side of the amplitude center, the lower side switching element of a phase different from the two phases is set as the sub target switching element. Mixed loop control can be executed with not only the main target switching element, but also with a pair including a main target switching element and a sub target switching element, and it is possible to increase the control range.

Also, it is preferable that after the contactor (9) has entered the open state, the inverter control device (20) switches a control mode from three-phase drive control for performing power conversion between direct current and three-phase alternating current to the mixed loop control. By shifting directly from three-phase drive control to mixed loop control without performing shutdown control or active short control therebetween, it is possible to suppress a sudden rise in the DC link voltage (Vdc) caused by shutdown control.

INDUSTRIAL APPLICABILITY

The present disclosure is applicable to an inverter control device that controls driving of an alternating current rotating electric machine via an inverter.

The invention claimed is:

1. An inverter control device for controlling a rotating electric machine drive device that drives an alternating current rotating electric machine and includes an inverter and a DC link capacitor, the inverter being connected to a DC power supply via a contactor, being connected to the rotating electric machine, and performing power conversion between direct current and three-phase alternating current, the DC link capacitor smoothing a DC link voltage, which is a DC-side voltage of the inverter, and the inverter control device performing switching control on switching elements that form the inverter, the inverter control device comprising:

an electronic control unit with control logic, which when executed, executes, when the contactor has entered an open state during rotation of the rotating electric machine, mixed loop control for switching one or two target switching elements out of the switching elements that form the inverter to an on state so as to form one capacitor charging loop for charging the DC link capacitor with electrical power generated by the rotating electric machine and form one reflux loop for causing the generated electrical power to circulate between the inverter and the rotating electric machine, the capacitor charging loop and the reflux loop being formed at the same time.

2. The inverter control device according to claim 1, wherein after the mixed loop control has started, when the currents of the three phases all become zero, the electronic control unit executes shutdown control to switch all of the target switching elements to an off state.

3. The inverter control device according to claim 2, wherein:

in the inverter, an arm for each alternating current phase is formed by a series circuit including an upper side switching element and a lower side switching element, the electronic control unit executes the mixed loop control in which at least one main target switching element is switched to the on state as the target switching element, when execution of the mixed loop control is started, in a case where current waveforms of two phases out of the three phases are on a positive side of an amplitude center, the upper side switching element of one out of the two phases is set as the main target switching element, and when execution of the mixed loop control is started, in a case where current waveforms of two phases out of the three phases are on a negative side of the amplitude center, the lower side switching element of one out of the two phases is set as the main target switching element.

4. The inverter control device according to claim 3, wherein:

when execution of the mixed loop control is started, in a case where current waveforms of two phases out of the three phases are on the positive side of the amplitude center, out of the two phases, the upper side switching element of a phase in which the current waveform is descending is set as the main target switching element, and when execution of the mixed loop control is started, in a case where current waveforms of two phases out of the three phases are on the negative side of the amplitude center, out of the two phases, the lower side switching element of a phase in which the current waveform is rising is set as the main target switching element.

5. The inverter control device according to claim 4, wherein:

the electronic control unit executes the mixed loop control in which a sub target switching element is set to the on state in addition to the main target switching element, when execution of the mixed loop control is started, in a case where current waveforms of two phases out of the three phases are on the positive side of the amplitude center, the upper side switching element of a phase different from the two phases is set as the sub target switching element, and when execution of the mixed loop control is started, in a case where current waveforms of two phases out of the three phases are on the negative side of the amplitude center, the lower side switching element of a phase different from the two phases is set as the sub target switching element.

6. The inverter control device according to claim 5, wherein after the contactor has entered the open state, a control mode is switched from three-phase drive control for performing power conversion between direct current and three-phase alternating current to the mixed loop control.

7. The inverter control device according to claim 4, wherein after the contactor has entered the open state, a control mode is switched from three-phase drive control for performing power conversion between direct current and three-phase alternating current to the mixed loop control.

8. The inverter control device according to claim 3, wherein:

the electronic control unit executes the mixed loop control in which a sub target switching element is set to the on state in addition to the main target switching element, when execution of the mixed loop control is started, in a case where current waveforms of two phases out of the three phases are on the positive side of the amplitude center, the upper side switching element of a phase different from the two phases is set as the sub target switching element, and when execution of the mixed loop control is started, in a case where current waveforms of two phases out of the three phases are on the negative side of the amplitude center, the lower side switching element of a phase different from the two phases is set as the sub target switching element.

9. The inverter control device according to claim 3, wherein after the contactor has entered the open state, a control mode is switched from three-phase drive control for performing power conversion between direct current and three-phase alternating current to the mixed loop control.

10. The inverter control device according to claim 2, wherein after the contactor has entered the open state, a control mode is switched from three-phase drive control for performing power conversion between direct current and three-phase alternating current to the mixed loop control.

11. The inverter control device according to claim 1, wherein:
   in the inverter, an arm for each alternating current phase is formed by a series circuit including an upper side switching element and a lower side switching element,
   the electronic control unit executes the mixed loop control in which at least one main target switching element is switched to the on state as the target switching element,
   when execution of the mixed loop control is started, in a case where current waveforms of two phases out of the three phases are on a positive side of an amplitude center, the upper side switching element of one out of the two phases is set as the main target switching element, and
   when execution of the mixed loop control is started, in a case where current waveforms of two phases out of the three phases are on a negative side of the amplitude center, the lower side switching element of one out of the two phases is set as the main target switching element.

12. The inverter control device according to claim 11, wherein:
   the electronic control unit executes the mixed loop control in which a sub target switching element is set to the on state in addition to the main target switching element,
   when execution of the mixed loop control is started, in a case where current waveforms of two phases out of the three phases are on the positive side of the amplitude center, the upper side switching element of a phase different from the two phases is set as the sub target switching element, and
   when execution of the mixed loop control is started, in a case where current waveforms of two phases out of the three phases are on the negative side of the amplitude center, the lower side switching element of a phase different from the two phases is set as the sub target switching element.

13. The inverter control device according to claim 1, wherein after the contactor has entered the open state, a control mode is switched from three-phase drive control for performing power conversion between direct current and three-phase alternating current to the mixed loop control.

* * * * *